US012476346B2

(12) United States Patent
Lin et al.

(10) Patent No.: US 12,476,346 B2
(45) Date of Patent: Nov. 18, 2025

(54) ANTENNA MODULE AND ELECTRONIC DEVICE

(71) Applicants: Chih-Heng Lin, Taipei (TW); Li-Chun Lee, Taipei (TW); Shih-Chia Liu, Taipei (TW); Jui-Hung Lai, Taipei (TW)

(72) Inventors: Chih-Heng Lin, Taipei (TW); Li-Chun Lee, Taipei (TW); Shih-Chia Liu, Taipei (TW); Jui-Hung Lai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 209 days.

(21) Appl. No.: 18/447,307

(22) Filed: Aug. 10, 2023

(65) Prior Publication Data

US 2024/0283129 A1 Aug. 22, 2024

(30) Foreign Application Priority Data

Feb. 22, 2023 (TW) ................................ 112106387

(51) Int. Cl.
*H01Q 1/22* (2006.01)
*H01Q 5/307* (2015.01)

(52) U.S. Cl.
CPC ........... *H01Q 1/2266* (2013.01); *H01Q 5/307* (2015.01)

(58) Field of Classification Search
CPC ...... H01Q 1/2266; H01Q 1/243; H01Q 5/307; H01Q 7/00
See application file for complete search history.

(56) References Cited

U.S. PATENT DOCUMENTS

2020/0076061 A1* 3/2020 Chen .................. H01Q 21/0068
2021/0359410 A1* 11/2021 Li .......................... H01Q 1/246

FOREIGN PATENT DOCUMENTS

TW 201705610 2/2017

OTHER PUBLICATIONS

"Office Action of Taiwan Counterpart Application", issued on Feb. 6, 2024, p. 1-p. 5.

* cited by examiner

*Primary Examiner* — Daniel Munoz
(74) *Attorney, Agent, or Firm* — JCIPRNET

(57) ABSTRACT

An antenna module includes a metal cover, a substrate, a first radiating element and a second radiating element. The metal cover has a slot. The substrate is disposed corresponding to the slot. The first radiating element is disposed on the substrate, the first radiating element includes an excited section and a first radiating section connected in sequence, and the excited section has a feeding point. The second radiating element is disposed on the substrate, the second radiating element includes the excited section and a second radiating section connected in sequence, and the excited section is located between the first radiating section and the second radiating section. A length of the first radiating section is greater than a length of the second radiating section, the first radiating element is used to excite a first resonant frequency, and the second radiating element is used to excite a second resonant frequency.

29 Claims, 15 Drawing Sheets

ANTENNA MODULE AND ELECTRONIC DEVICE

CROSS-REFERENCE TO RELATED APPLICATION

This application claims the priority benefit of Taiwan application serial no. 112106387, filed on Feb. 22, 2023. The entirety of the above-mentioned patent application is hereby incorporated by reference herein and made a part of this specification.

BACKGROUND

Technical Field

The disclosure relates to an antenna module and an electronic device, and in particular relates to an antenna module and an electronic device of a slot antenna.

Description of Related Art

Nowadays, many electronic devices adopt an all-metal chassis or a casing mostly made of metal to enhance the durability. However, the use of a metal chassis may make the design threshold of some functional modules (such as antenna modules) more challenging.

Therefore, how to maintain the appearance design of the electronic device and take into account the radiation characteristics of the antenna module has become one of the problems to be solved in this field.

SUMMARY

An antenna module with good radiation characteristics is provided in this disclosure.

An electronic device is provided in this disclosure, which includes the antenna module.

The antenna module of the disclosure includes a metal cover, a substrate, a first radiating element, and a second radiating element. The metal cover has a slot. The substrate is disposed corresponding to the slot. The first radiating element is disposed on the substrate, the first radiating element includes an excited section and a first radiating section connected in sequence, and the excited section has a feeding point. The second radiating element is disposed on the substrate, the second radiating element includes the excited section and a second radiating section connected in sequence, and the excited section is located between the first radiating section and the second radiating section. A length of the first radiating section is greater than a length of the second radiating section, the first radiating element is used to excite a first resonant frequency, and the second radiating element is used to excite a second resonant frequency.

The electronic device of the disclosure includes a first body and an antenna module. The first body includes a metal cover, and the metal cover has a slot. The antenna module is disposed in the metal cover, and the antenna module includes a substrate, a first radiating element and a second radiating element. The substrate is disposed corresponding to the slot. The first radiating element is disposed on the substrate, the first radiating element includes an excited section and a first radiating section connected in sequence, and the excited section has a feeding point. The second radiating element is disposed on the substrate, the second radiating element includes the excited section and a second radiating section connected in sequence, and the excited section is located between the first radiating section and the second radiating section. A length of the first radiating section is greater than a length of the second radiating section, the first radiating element is used to excite a first resonant frequency, and the second radiating element is used to excite a second resonant frequency.

In an embodiment of the disclosure, the first radiating section includes a first section, a second section, and a third section. The second section extends along a first direction, and the first section and the third section extend along a second direction perpendicular to the first direction. The first section, the second section, and the third section form a plurality of bends to jointly form a first loop structure with the excited section, and a portion of an orthographic projection of the first loop structure to the metal cover overlaps with the slot.

In an embodiment of the disclosure, the second radiating section includes a fourth section, a fifth section, and a sixth section. The fifth section extends along the first direction, and the fourth section and the sixth section extend along the second direction. The fourth section, the fifth section, and the sixth section form a plurality of bends to jointly form a second loop structure with the excited section, and a portion of an orthographic projection of the second loop structure to the metal cover overlaps with the slot.

In an embodiment of the disclosure, a first length of the slot along the first direction is greater than or equal to 2 mm, and a second length of the slot along the second direction is between 40 mm and 70 mm.

In an embodiment of the disclosure, a third length of the first radiating element along the second direction is between ½ wavelength and ¼ wavelength of the first resonant frequency.

In an embodiment of the disclosure, a fourth length of the second radiating element along the second direction is between ½ wavelength and ¼ wavelength of the second resonant frequency.

In an embodiment of the disclosure, the slot has a first side and a second side opposite to each other. The excited section is lapped between the first side and the second side, the first side is farther away from the feeding point than the second side, the first section and the fourth section correspond to the first side, and the third section and the sixth section correspond to the second side.

In an embodiment of the disclosure, a distance from the first section and the fourth section to the first side is between 1 mm and 3 mm.

In an embodiment of the disclosure, the substrate has a first region surrounded by the first loop structure, the antenna module further includes a first matching section connected to the first section, and the first matching section protrudes from the first section toward the first region and overlaps the slot.

In an embodiment of the disclosure, in the second direction, a distance from the first matching section to the feeding point is between ⅛ wavelength and ⅜ wavelength of the first resonant frequency.

In an embodiment of the disclosure, the substrate has a second region surrounded by the second loop structure, the antenna module further includes a second matching section connected to the fourth section, and the second matching section protrudes from the fourth section toward the second region and overlaps the slot.

In an embodiment of the disclosure, in the second direction, a distance from the second matching section to the feeding point is between ⅛ wavelength and ⅜ wavelength of the second resonant frequency.

In an embodiment of the disclosure, the antenna module further includes a metal sheet, and the metal sheet is connected to the substrate and the metal cover.

In an embodiment of the disclosure, an end of the excited section away from the feeding point has a via hole, the via hole penetrates the substrate, and the antenna module further includes a metal layer located on an inner side of the via hole and extending from the excited section to adjoin the slot.

In an embodiment of the disclosure, at least a portion of a current of the first radiating section flows through the metal cover.

In an embodiment of the disclosure, at least a portion of a current of the second radiating section flows through the metal cover.

In an embodiment of the disclosure, the electronic device further includes a second body, the second body is pivotally connected to the first body, the first body is a display body, and the second body is a logic body.

Based on the above, in the antenna module of the disclosure, by using the excited section as the metal radiating section shared by the first radiating element and the second radiating element, the first radiating element and the second radiating element respectively excite the resonant frequency with the slot. In this way, the antenna module can excite a multi-band resonant mode.

In order to make the above-mentioned features and advantages of the disclosure comprehensible, embodiments accompanied with drawings are described in detail below.

DETAILED DESCRIPTION OF DISCLOSED EMBODIMENTS

Figure 1:
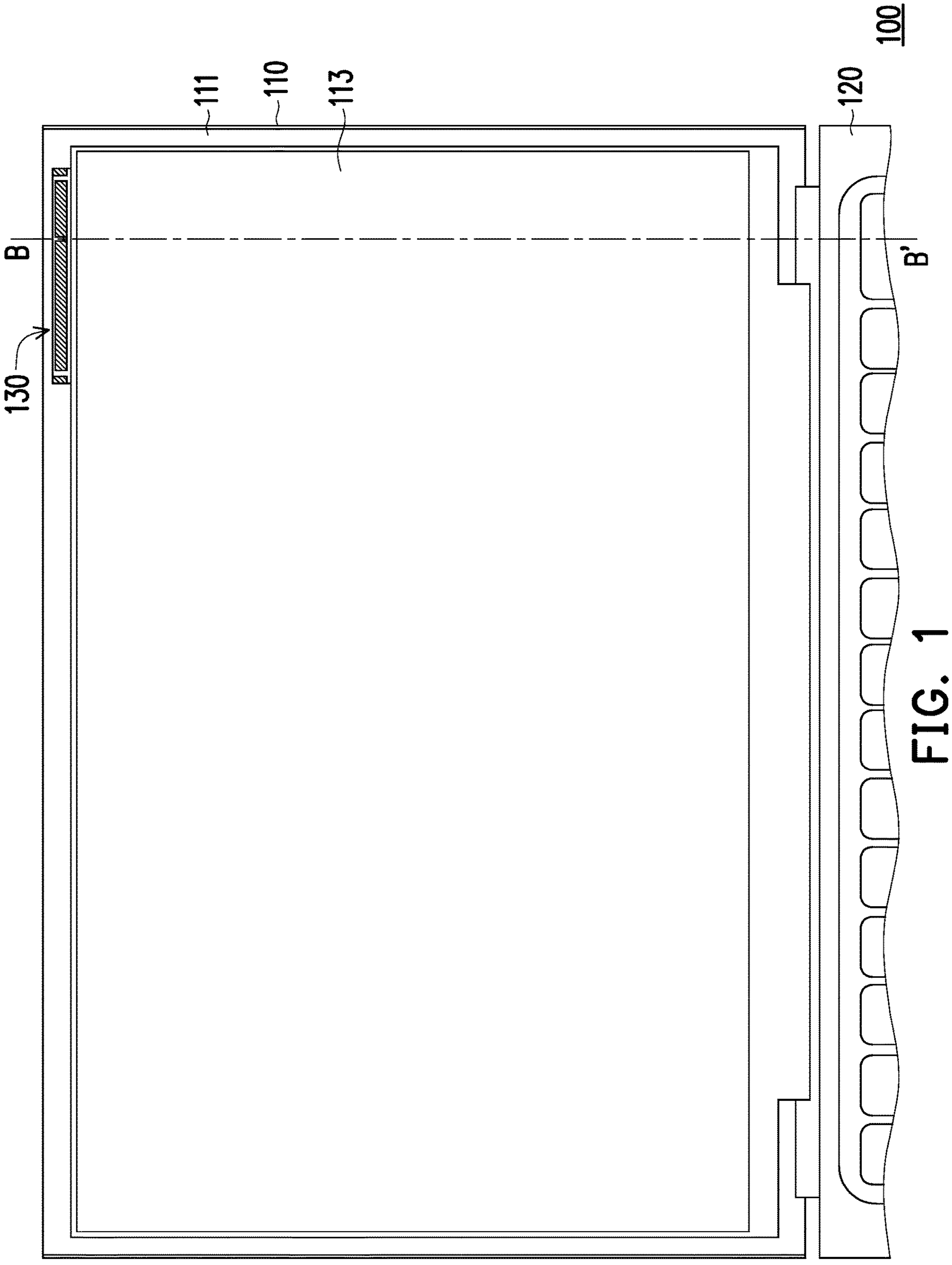
FIG. 1 is a front schematic view of an electronic device according to an embodiment of the disclosure.

FIG. 1 is a front schematic view of an electronic device according to an embodiment of the disclosure. Referring to FIG. 1, the electronic device 100 of this embodiment includes a first body 110, a second body 120, and an antenna module 130. The first body 110 is pivotally connected to the second body 120, and the antenna module 130 is disposed on the first body 110. In this embodiment, the electronic device 100 is, for example, a laptop. The first body 110 is a display body with a display screen 113. The antenna module 130 is located behind the display screen 113, a portion of the antenna module 130 is located at the narrow bezel above the display screen 113, and the second body 120 is a logic body, but the type of the electronic device 100 is not limited thereto. In other embodiments, the electronic device 100 may also be a tablet or a smartphone, and the type of the electronic device 100 is not limited thereto.

Figure 2A:
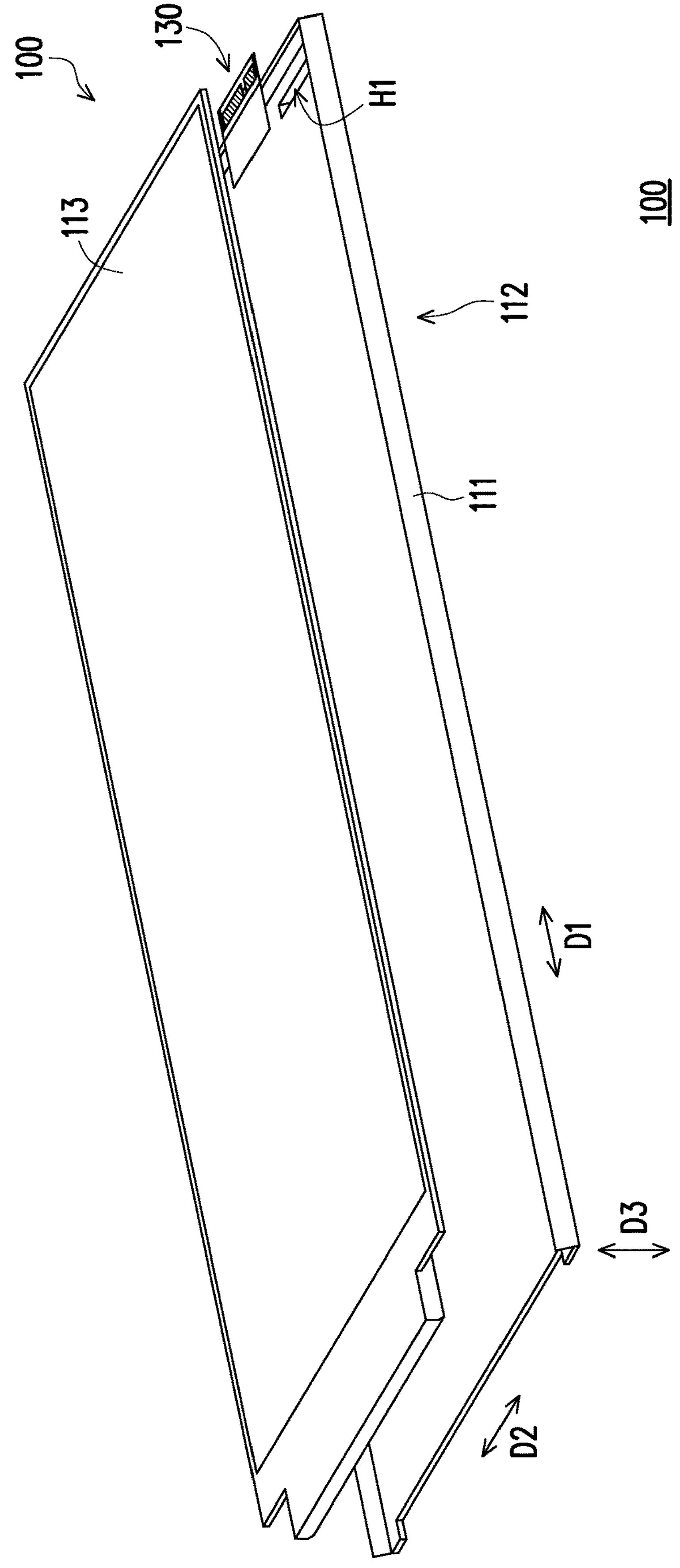
FIG. 2A is an exploded schematic view of a portion of the elements of the electronic device of FIG. 1.
Figure 2B:
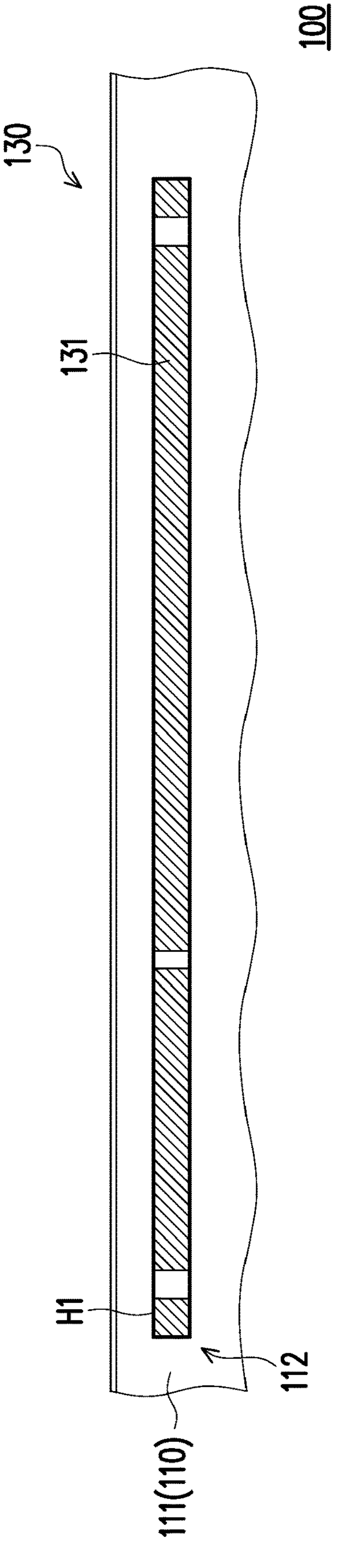
FIG. 2B is a schematic rear view of the electronic device of FIG. 1.
Figure 2C:
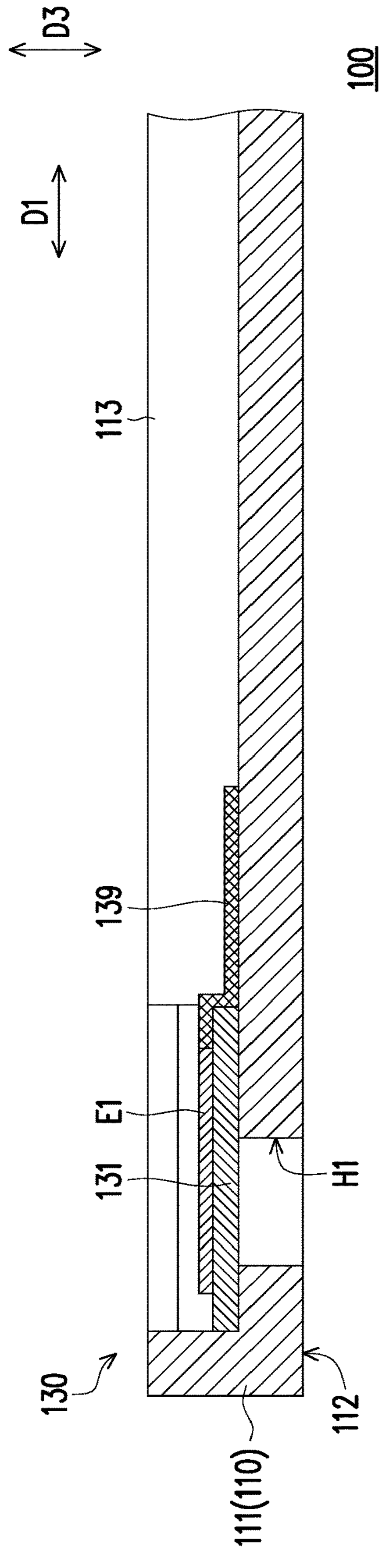
FIG. 2C is a cross-sectional schematic view of the electronic device in FIG. 1 along the section line B-B'.
Figure 2D:
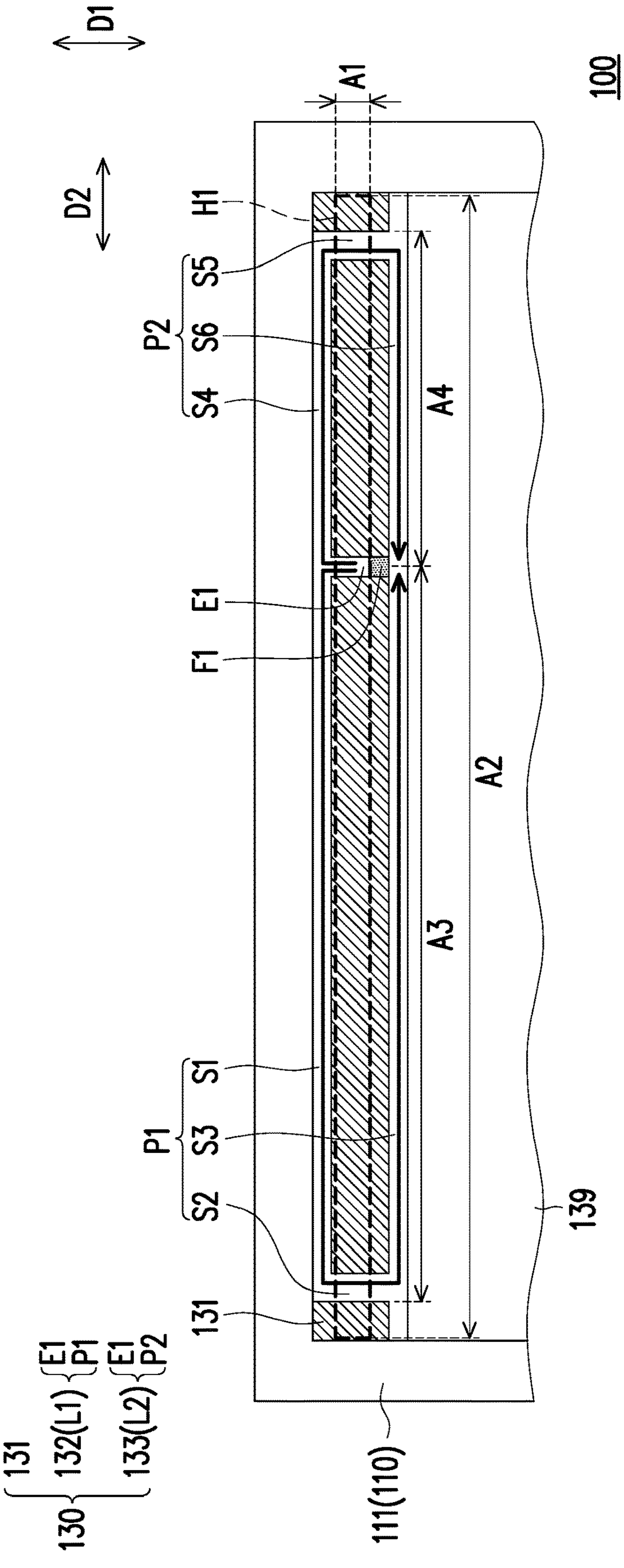
FIG. 2D is a partially enlarged schematic view of the electronic device of FIG. 1.

FIG. 2A is an exploded schematic view of a portion of the elements of the electronic device of FIG. 1. FIG. 2B is a schematic rear view of the electronic device of FIG. 1. FIG. 2C is a cross-sectional schematic view of the electronic device in FIG. 1 along the section line B-B'. FIG. 2D is a partially enlarged schematic view of the electronic device of FIG. 1. It should be noted that the direction of the current path is schematically shown in the direction of the arrow in FIG. 2D.

In this embodiment, the first body 110 includes a metal cover 111, the metal cover 111 has a slot H1, the metal cover 111 has a first surface 112 facing away from the substrate 131, and the slot H1 penetrates the first surface 112 and is a closed slot. Here, the first surface 112 is also an outer surface of the first body 110, but the disclosure is not limited thereto.

In this embodiment, the antenna module 130 is disposed inside the metal cover 111, and the antenna module 130 includes a substrate 131, a first radiating element 132, and a second radiating element 133. The substrate 131 corresponds to the slot H1.

In this embodiment, the first radiating element 132 is, for example, a metal material, and is located on the substrate 131. The first radiating element 132 includes an excited section E1 and a first radiating section P1 connected in sequence, and the excited section E1 has a feeding point F1. The second radiating element 133 is, for example, a metal material, and is located on the substrate 131. The second radiating element 133 includes an excited section E1 and a second radiating section P2 connected in sequence. The excited section E1 is located between the first radiating section P1 and the second radiating section P2. In this embodiment, the excited section E1 is used as a metal radiating section shared by the first radiating element 132 and the second radiating element 133, but the disclosure is not limited thereto.

In this embodiment, the first radiating section P1 includes a first section S1, a second section S2, and a third section S3. The second section S2 extends along a first direction D1, and the first section S1 and the third section S3 extend along a second direction D2 perpendicular to the first direction D1. The first section S1, the second section S2, and the third section S3 form a plurality of bends until the end is grounded, to jointly form a first loop structure L1 with the excited section E1. A portion of an orthographic projection of the first loop structure L1 to the metal cover 111 overlaps with the slot H1.

In an embodiment of the disclosure, the second radiating section P2 includes a fourth section S4, a fifth section S5, and a sixth section S6. The fifth section S5 extends along the first direction D1, and the fourth section S4 and the sixth section S6 extend along the second direction D2. The fourth section S4, the fifth section S5, and the sixth section S6 form a plurality of bends until the end is grounded, to jointly form a second loop structure L2 with the excited section E1, and a portion of an orthographic projection of the second loop structure L2 to the metal cover 111 overlaps with the slot H1.

In this embodiment, the length of the first radiating section P1 is greater than the length of the second radiating section P2, that is, the length of the first loop structure L1 is greater than the length of the second loop structure L2. In this embodiment, the first radiating element 132 is used to excite a first resonant frequency, and the second radiating element 133 is used to excite a second resonant frequency, but the disclosure is not limited thereto.

In detail, in this embodiment, the substrate 131 is, for example, an FR4 dielectric substrate, an LDS plastic substrate, or an FPC, but the disclosure is not limited thereto. In this embodiment, the antenna layout may be implemented on the substrate 131. Specifically, the antenna module 130 further includes a metal sheet 139, which is disposed on the substrate 131 and partially connected to the metal cover 111. The metal sheet 139 is, for example, copper foil or aluminum foil, which is suitable for connecting pads, but the disclosure is not limited thereto. In this embodiment, the excited section E1, the first section S1, the second section S2, the third section S3, the fourth section S4, the fifth section S5, and the sixth section S6 are used as the antenna layout (copper), and are connected with the metal sheet 139.

Figure 3:
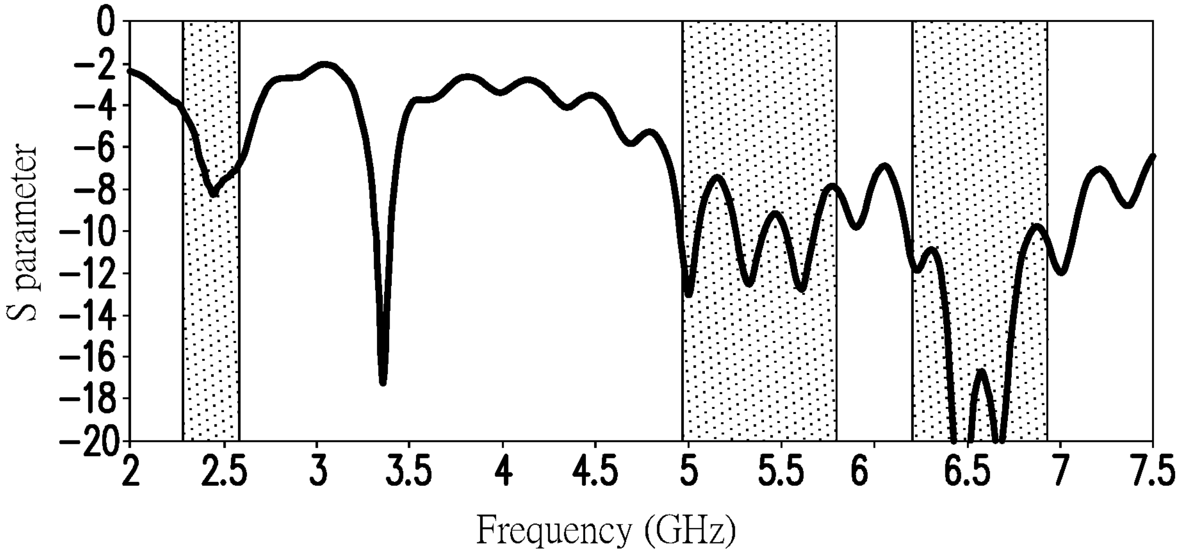
FIG. 3 is a relationship diagram of the frequency-S parameter of the electronic device of FIG. 1.

FIG. 3 is a relationship diagram of the frequency-S parameter (S11) of the electronic device of FIG. 1. Under the above-mentioned configuration, through the coupling of the first loop structure L1 (long loop), the second loop structure L2 (short loop) and the slot H1, the resonant modes of 2.4 GHz (first resonant frequency), 5 GHz (second resonant frequency) and 6 GHz (slot double frequency) are respectively excited, but the disclosure is not limited thereto. In this way, the antenna module 130 can excite a multi-band resonant mode which can cover WiFi 6E band. In addition, it is only required to open a slot on the exterior of the metal cover 111 of the electronic device 100 of this embodiment to maintain good radiation characteristics of the antenna.

Furthermore, referring to FIG. 2D, in this embodiment, a first length A1 of the slot H1 along the first direction D1 is greater than or equal to 2 millimeters (mm), and a second length A2 of the slot H1 along the second direction D2 is between 40 mm and 70 mm, but the disclosure is not limited thereto.

In this embodiment, a third length A3 of the first radiating element 132 along the second direction D2 is between ½ wavelength and ¼ wavelength of the first resonant frequency, but the disclosure is not limited thereto. A fourth length A4 of the second radiating element 133 along the second direction D2 is between ½ wavelength and ¼ wavelength of the second resonant frequency, but the disclosure is not limited thereto.

Other embodiments are described below for illustrative purposes. It is to be noted that the following embodiments use the reference numerals and a part of the contents of the above embodiments, and the same reference numerals are used to denote the same or similar elements, and the description of the same technical contents is omitted. For the description of the omitted part, reference may be made to the above embodiments, and details are not described in the following embodiments.

The design of a matching section of the antenna module according to an embodiment of the disclosure is introduced below.

Figure 4:
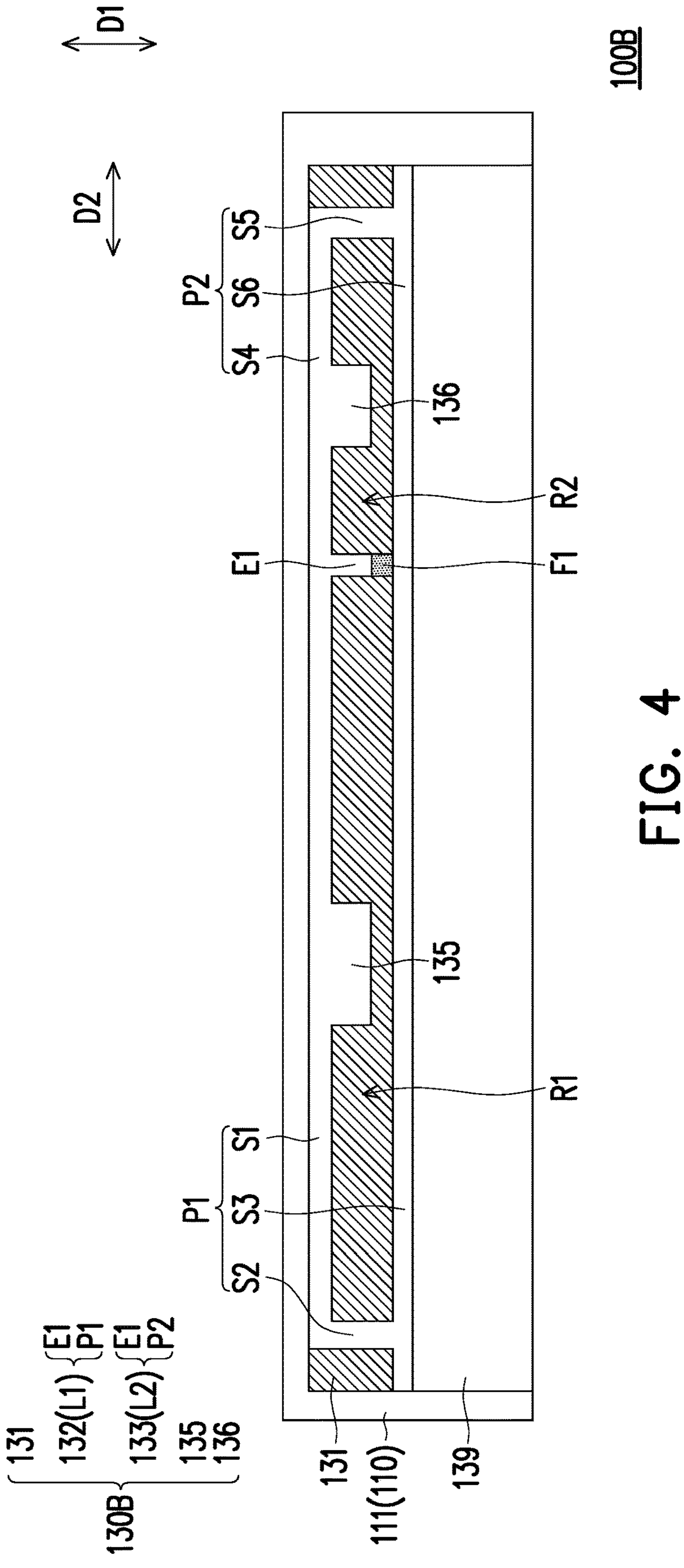
FIG. 4 is a partially enlarged front schematic view of an electronic device according to an embodiment of the disclosure.

FIG. 4 is a partially enlarged front schematic view of an electronic device according to an embodiment of the disclosure. Referring to FIG. 4, in this embodiment, the electronic device 100B includes an antenna module 130B, the substrate 131 of the antenna module 130B has a first region R1 surrounded by the first loop structure L1, and the antenna module 130B further includes a first matching section 135 connected to the first section S1. The first matching section 135 protrudes from the first section S1 toward the first region R1, and in the second direction D2, the distance from the first matching section 135 to the feeding point F1 is between ⅛ wavelength and ⅜ wavelength of the first resonant frequency. The position and matching of the first resonant frequency may be adjusted.

In this embodiment, the substrate 131 has a second region R2 surrounded by the second loop structure L2, and the antenna module 130B further includes a second matching section 136 connected to the fourth section S4. The second matching section 136 protrudes from the fourth section S4 toward the second region R2, and in the second direction D2, the distance from the second matching section 136 to the feeding point F1 is between ⅛ wavelength and ⅜ wavelength of the second resonant frequency. The position and matching of the second resonant frequency may be adjusted.

In this embodiment, the antenna module 130 includes a first matching section 135 and a second matching section 136. However, in other embodiments, the antenna module includes only, for example, the first matching section or the second matching section, and the configuration of the matching section may be determined according to actual requirements, which is not limited by the disclosure.

The following introduces the relationship between the distance between the metal line section and the slot of the antenna module and the radiation capability of the antenna according to an embodiment of the disclosure.

Figure 5A:
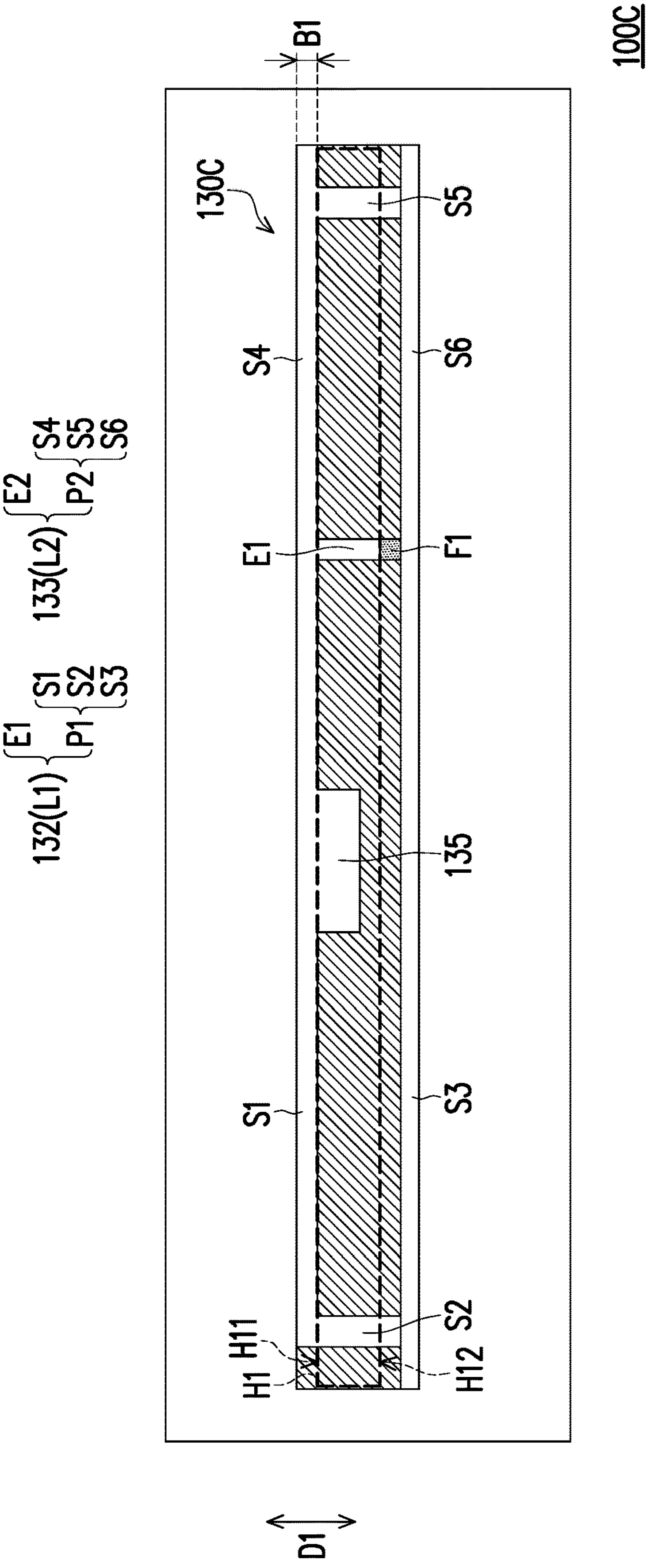
FIG. 5A to FIG. 5C are partially enlarged front schematic views of electronic devices according to multiple embodiments of the disclosure.
Figure 5B:
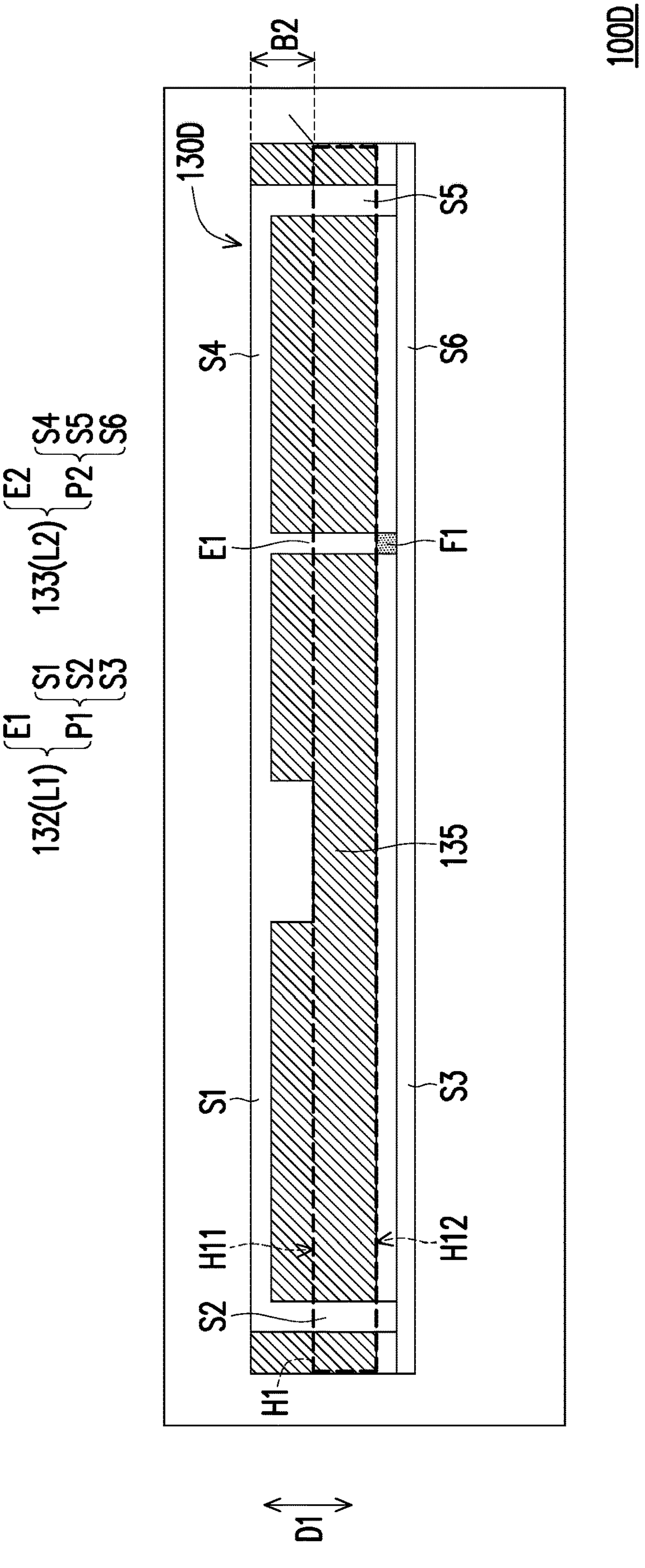
Figure 5C:
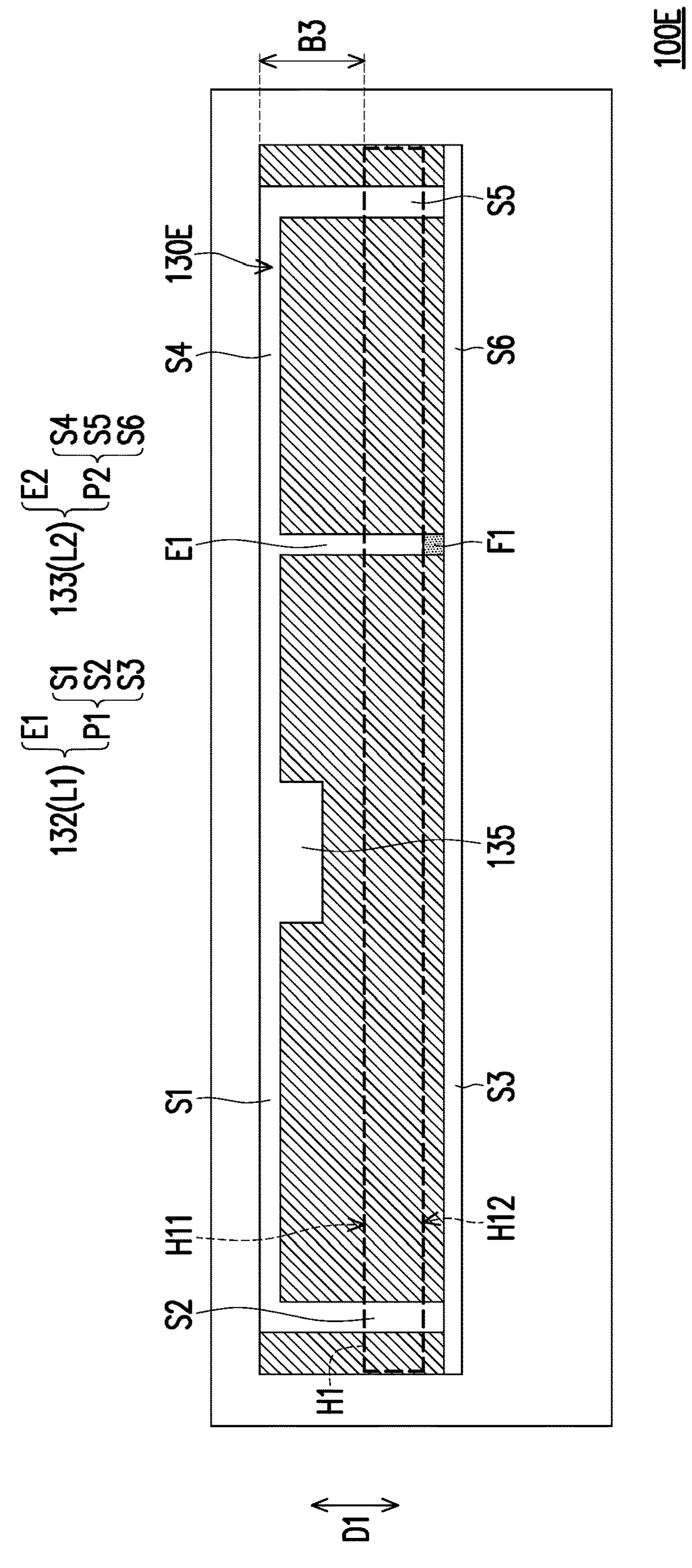
Figure 5D:
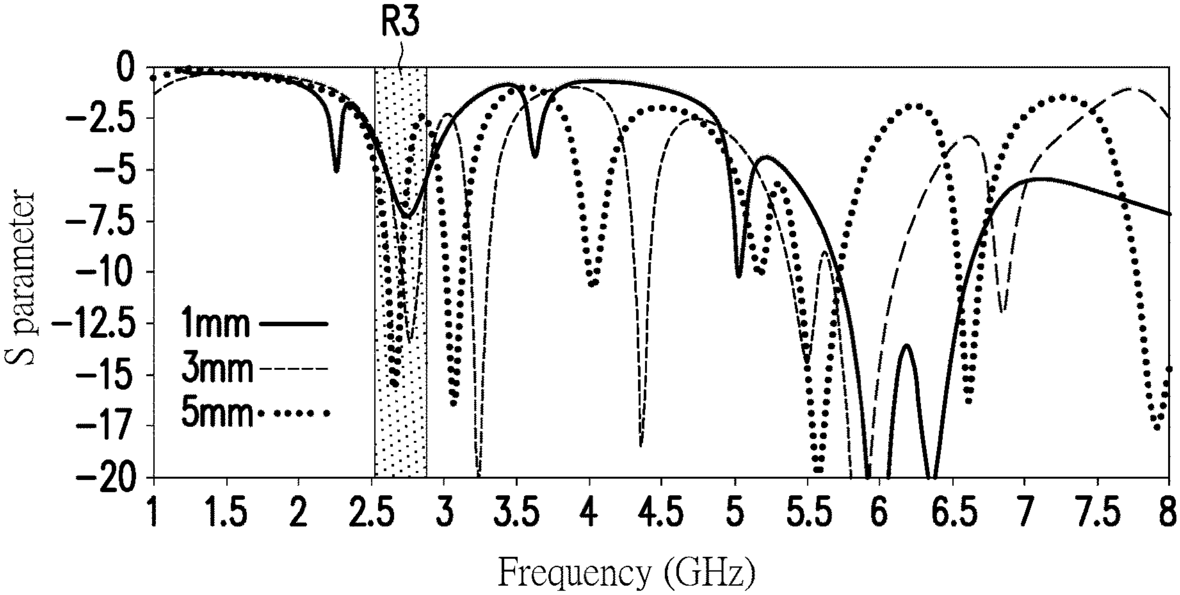
FIG. 5D is a relationship diagram of the frequency-S parameter of the electronic device of FIG. 5A to FIG. 5C.

FIG. 5A to FIG. 5C are partially enlarged front schematic views of electronic devices according to multiple embodiments of the disclosure. FIG. 5D is a relationship diagram of the frequency-S parameter of the electronic device of FIG. 5A to FIG. 5C. Referring to FIG. 5A first, in this embodiment, the electronic device 100C includes an antenna module 130C. The slot H1 of the antenna module 130C has a first side H11 and a second side H12 opposite to each other. The excited section E1 is lapped between the first side H11 and the second side H12, the first side H11 is farther away from the feeding point F1 than the second side H12, the first section S1 and the fourth section S4 correspond to the first side H11, the third section S3 and the sixth section S6 correspond to the second side H12.

In this embodiment, in the first direction D1, the distance B1 from the first section S1 and the fourth section S4 to the first side H11 is about 1 mm, the first section S1 and the fourth section S4 are aligned with the first side H11, and the first matching section 135 overlaps the slot H1.

Referring to FIG. 5B, the electronic device 100D includes an antenna module 130D. In the first direction D1, the distance B2 from the first section S1 and the fourth section S4 of the antenna module 130D to the first side H11 is about 3 mm.

Referring to FIG. 5C, the electronic device 100E includes an antenna module 130E. In the first direction D1, the distance B3 from the first section S1 and the fourth section S4 of the antenna module 130E to the first side H11 is about 5 mm.

Referring to FIG. 5D, the region R3 is the antenna mode resonated by the first loop structure L1 (long loop). According to the experimental results, it may be known that controlling the distance between the metal line section of the horizontal loop portion and the slot H1 affects the radiation capability of the antenna. That is to say, the farther the first section S1 and the fourth section S4 are from the slot H1, the weaker the radiation capability of the antenna is. In this embodiment, the distance from the first section S1 and the fourth section S4 to the first side H11 is preferably between 1 mm and 3 mm, but the disclosure is not limited thereto.

The following introduces the relationship between the distance between the substrate and the slot and the radiation capability of the antenna according to an embodiment of the disclosure.

Figure 6A:
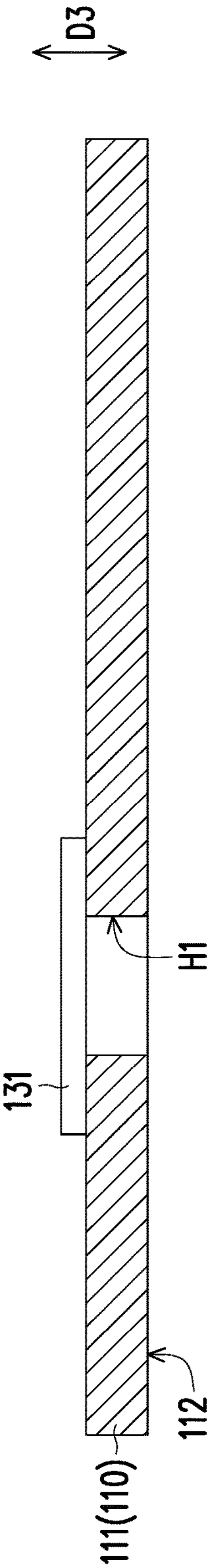
FIG. 6A to FIG. 6C are side schematic views of electronic devices according to multiple embodiments of the disclosure.
Figure 6B:
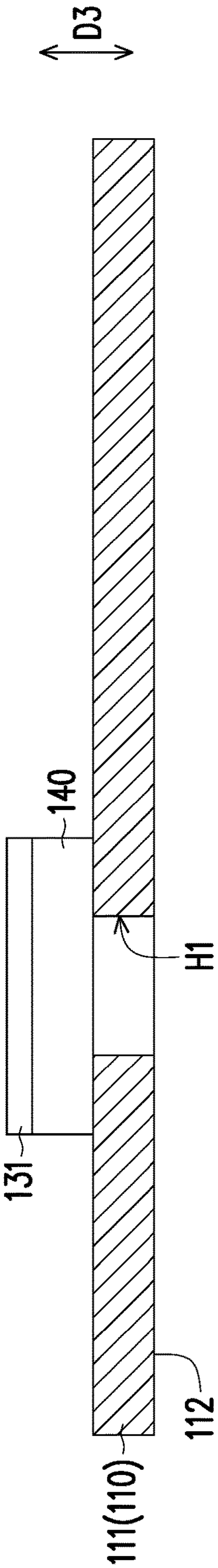
Figure 6C:
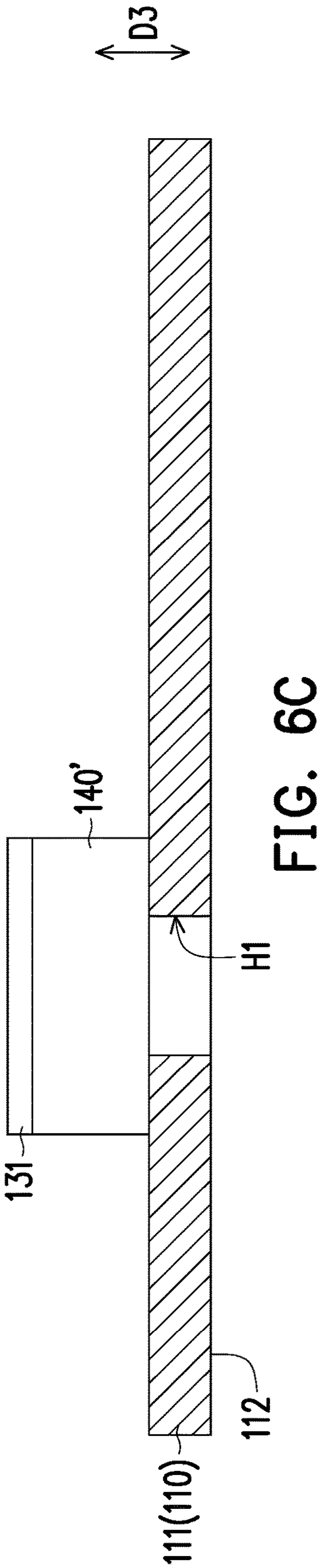
Figure 6D:
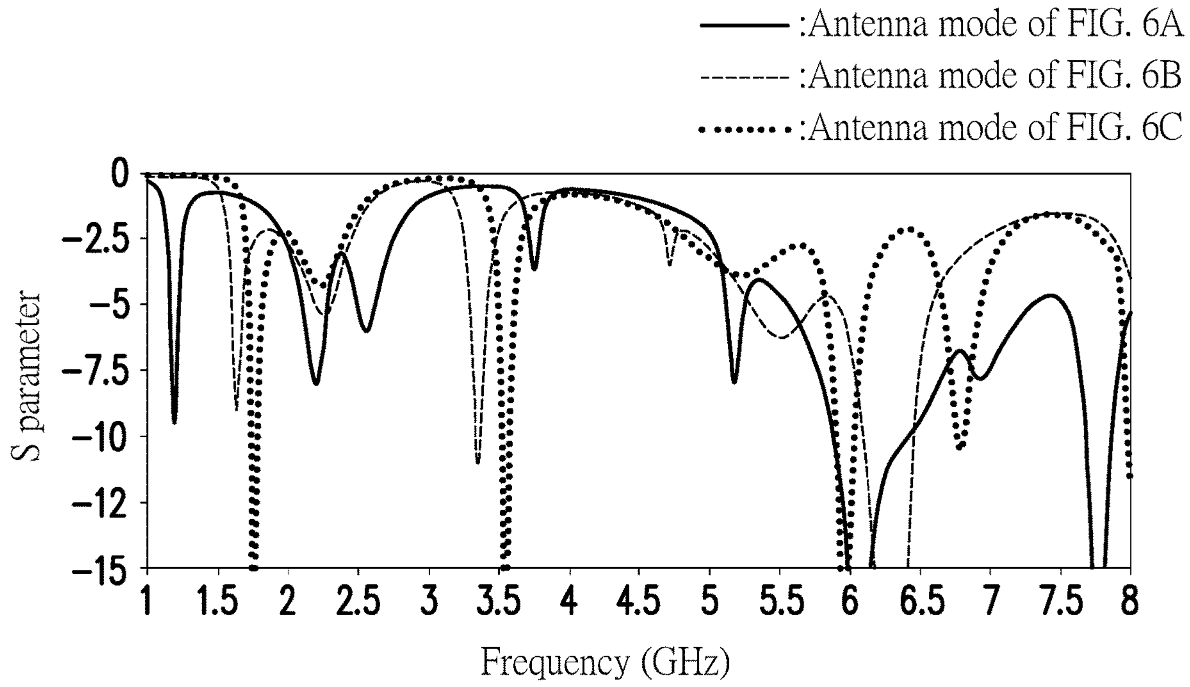
FIG. 6D is a relationship diagram of the frequency-S parameter of FIG. 6A to FIG. 6C.

FIG. 6A to FIG. 6C are side schematic views of electronic devices according to multiple embodiments of the disclosure. FIG. 6D is a relationship diagram of the frequency-S parameter of FIG. 6A to FIG. 6C.

Please refer to FIG. 6A, the substrate 131 has a thickness of about 0.4 mm, and in the third direction D3, the distance between the antenna and the slot H1 is about 0.4 mm. Referring to FIG. 6B, the substrate 131 is disposed on a support 140 with a thickness of about 1 mm, and in the third direction D3, the distance between the antenna and the slot H1 is about 1.4 mm. Referring to FIG. 6C, the substrate 131 is disposed on a support 140' with a thickness of about 2 mm, and in the third direction D3, the distance between the antenna and the slot H1 is about 2.4 mm.

Referring to FIG. 6D, from experimental results, it may be known that the effect of the virtual short circuit may not be formed if the antenna module 130 is too far away from the slot H1. When the distance between the antenna module 130 and the slot H1 is increased by 1 mm, the slot mode formed by the virtual short circuit disappears, because the coupling energy is not enough to form a virtual short circuit at this distance. Therefore, the distance between the antenna and the slot H1 should be considered when designing the antenna module 130. Furthermore, the advantage of forming a virtual short circuit is that the slot mode formed by the virtual short circuit may increase the bandwidth of the antenna. At low frequency band (2.4 GHz), there are two resonant modes that may cover the frequency band of 2.4 to 2.5 GHz, and at high frequency band, additional resonant modes are excited to cover the WLANN 6E frequency band.

The implementation of the antenna module in other embodiments of the disclosure are introduced below.

FIG. 7A to FIG. 7D are partially enlarged front schematic views of electronic devices according to multiple embodiments of the disclosure. FIG. 8 is a cross-sectional schematic view of the electronic device in FIG. 7A. FIG. 9 is a relationship diagram of the frequency-S parameter of the electronic device of FIG. 7A. It should be noted that the direction of the current path is schematically shown in the direction of the arrow in FIG. 7A.

Figure 7A:
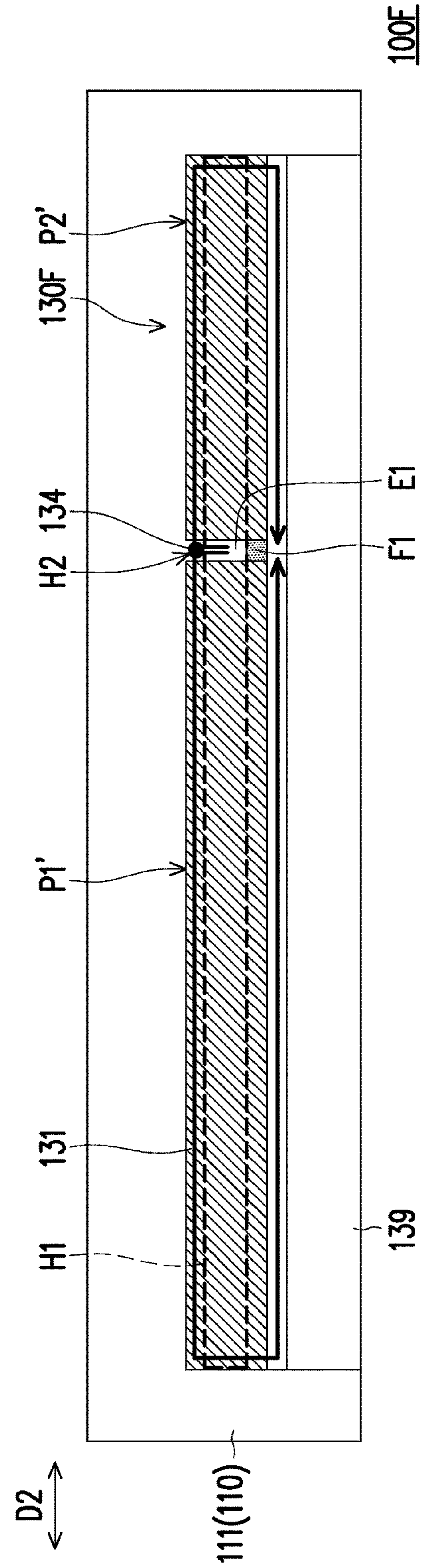
FIG. 7A to FIG. 7D are partially enlarged front schematic views of electronic devices according to multiple embodiments of the disclosure.
Figure 8:
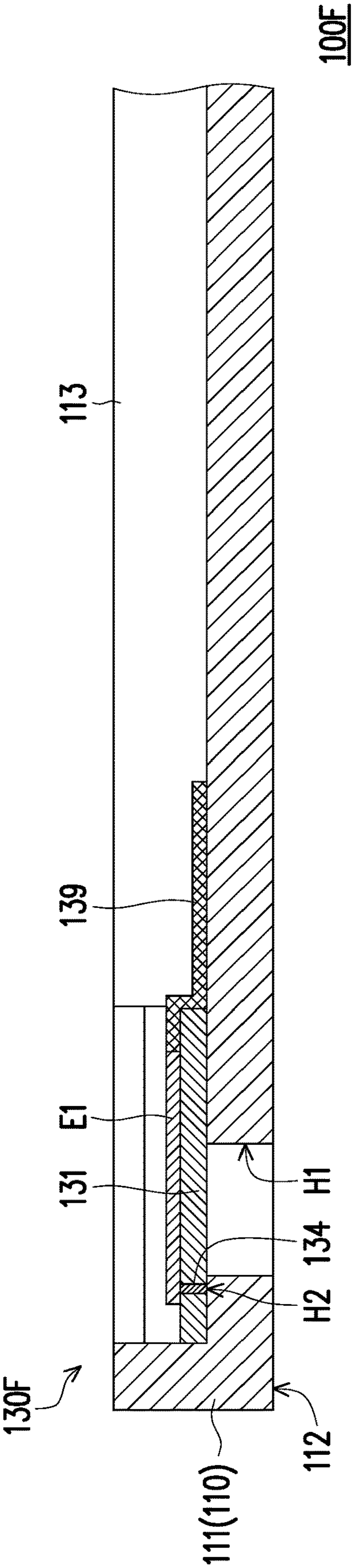
FIG. 8 is a cross-sectional schematic view of the electronic device in FIG. 7A.
Figure 9:
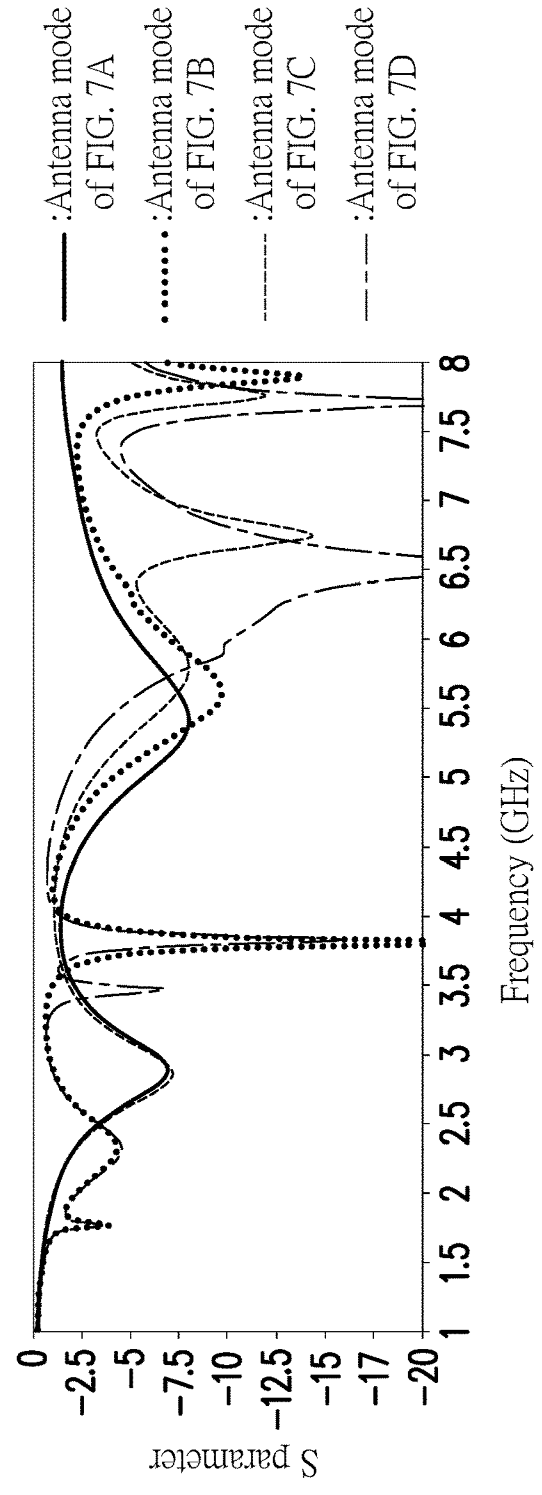
FIG. 9 is a relationship diagram of the frequency-S parameter of the electronic device of FIG. 7A.

Referring to FIG. 7A and FIG. 8 first, in this embodiment, the electronic device 100F includes an antenna module 130F. One end of the excited section E1 of the antenna module 130F away from the feeding point F1 has a via hole H2, and the via hole H2 penetrates the substrate 131. The antenna module 130F further includes a metal layer 134, such as a copper plating layer, located on the inner side of the via hole H2 and extending from the excited section E1 to adjoin the slot H1.

In this embodiment, the current distribution of the antenna module 130F starts from the feeding point F1, passes through the excited section E1, and then passes through the substrate 131 from the metal layer 134 located at the via hole H2. The current is divided into the left and right directions in the second direction D2, then passes through the metal cover 111 and excites the slot H1. That is to say, at least a portion of the current of the first radiating section P1' and at least a portion of the current of the second radiating section P2' flow through the metal cover 111. Therefore, the antenna module 130F of this embodiment may directly excite frequency bands through the metal cover 111 and the slot H1, but the disclosure is not limited thereto.

Figure 7B:
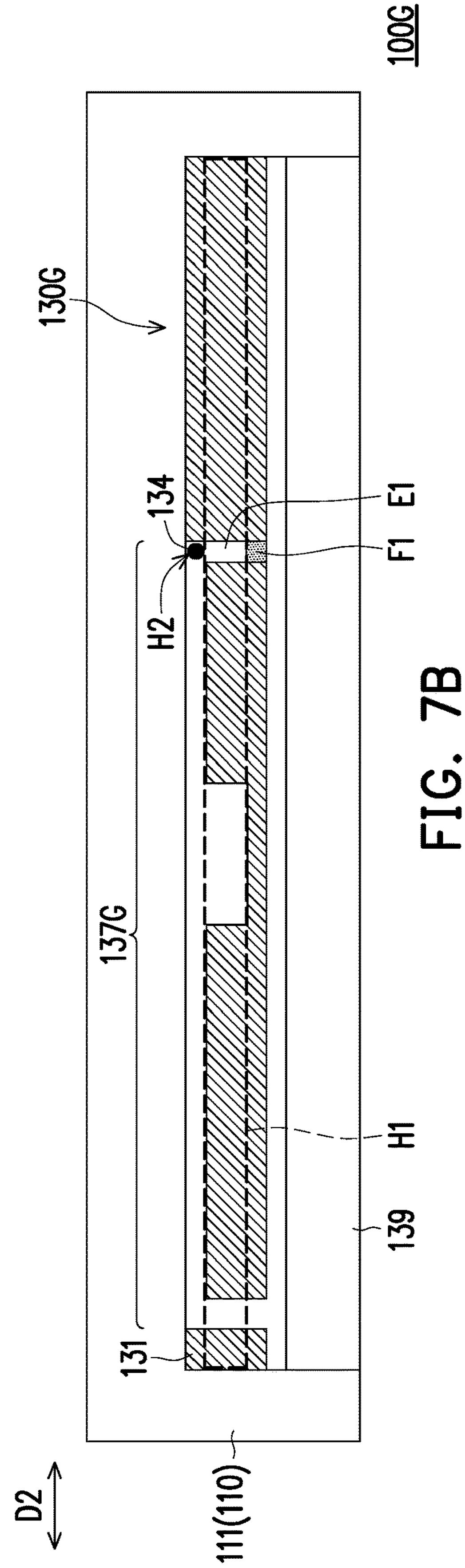

Referring to FIG. 7B, in this embodiment, the electronic device 100G is slightly different from the electronic device 100F shown in FIG. 7A, the main difference is that the antenna module 130G of the electronic device 100G further includes a metal section 137G located on the substrate 131, and the operating frequency of the low frequency may be controlled by the metal section 137G extending leftward from the position of the via hole H2, but the disclosure is not limited thereto.

Figure 7C:
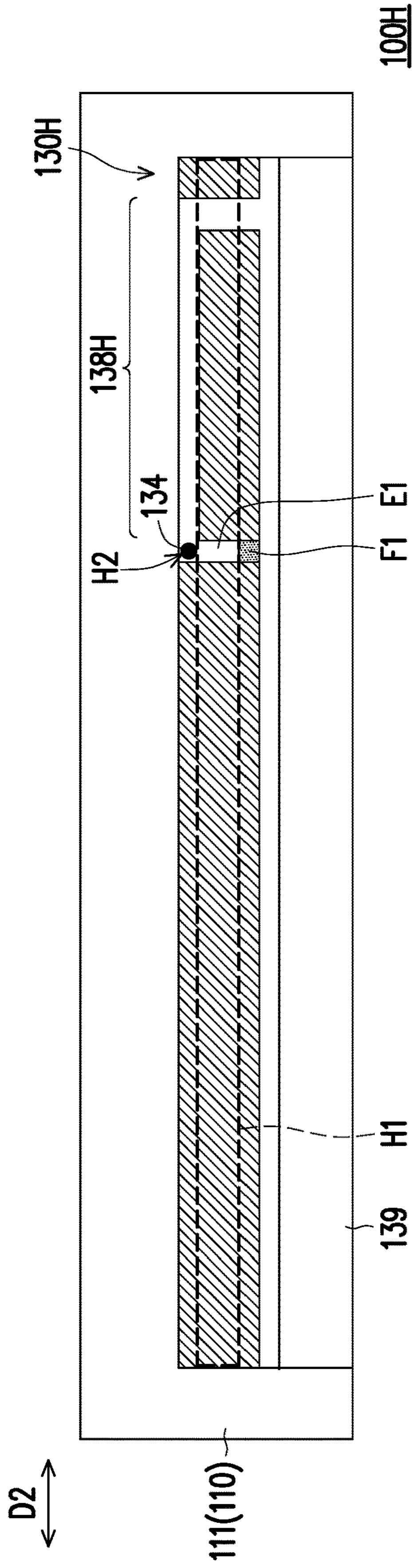

Referring to FIG. 7C, in this embodiment, the electronic device 100H is slightly different from the electronic device 100G shown in FIG. 7B, the main difference is that the antenna module 130H of the electronic device 100H further includes a metal section 138H located on the substrate 131, and the operating frequency of the high frequency may be controlled by the metal section 138H extending rightward from the position of the via hole H2, but the disclosure is not limited thereto.

Figure 7D:
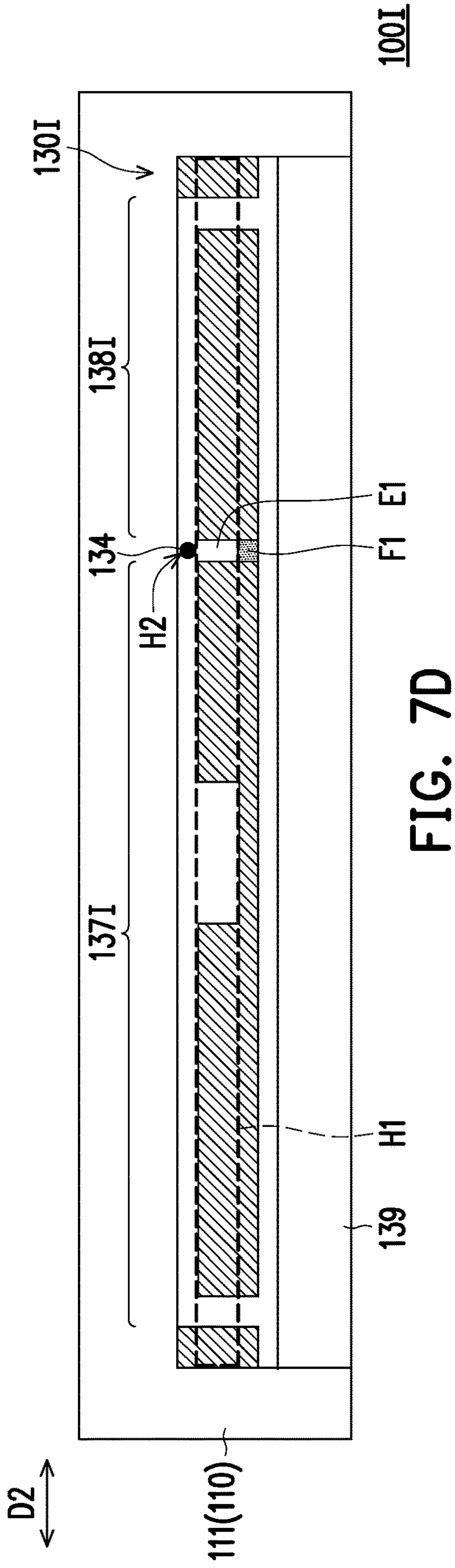

Referring to FIG. 7D, in this embodiment, the electronic device 100I is slightly different from the electronic device 100F shown in FIG. 7A, the main difference is that the antenna module 130I of the electronic device 100I further includes a metal section 137I and a metal section 138I located on the substrate 131, the operating frequency of the low frequency may be controlled by the metal section 137I extending leftward from the position of the via hole H2, and the operating frequency of the high frequency may be controlled by the metal section 138I extending rightward from the position of the via hole H2, but the disclosure is not limited thereto.

Referring to FIG. 9, for example, the antenna mode of FIG. 7B shows that its operating frequency may be controlled by the metal extending leftward from the position of the via hole H2. The antenna mode in FIG. 7D shows that the high frequency resonant mode may be increased by the metal extending rightward from the position of the via hole H2. In addition, if the structure of the via hole H2 and the metal layer 134 are removed from the antenna module 130I in FIG. 7D, a virtual short circuit is generated due to energy coupling, so the mode generated by the slot when directly fed in may be retained, and at a low frequency, in addition to the slot mode adjustment structure, additional modes are resonated.

To sum up, in the antenna module of the disclosure, by using the excited section as the metal radiating section shared by the first radiating element and the second radiating element, the first radiating element and the second radiating element respectively excite the resonant frequency with the slot. In this way, the antenna module can excite a multi-band resonant mode. In addition, it is only required to open a slot on the exterior of the metal cover of the electronic device of the disclosure to maintain good radiation characteristics of the antenna.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An antenna module, comprising:

a metal cover, having a slot;

a substrate, disposed corresponding to the slot;

a first radiating element, disposed on the substrate, comprising an excited section and a first radiating section connected in sequence, and the excited section having a feeding point; and a second radiating element, disposed on the substrate, comprising the excited section and a second radiating section connected in sequence, wherein the excited section is located between the first radiating section and the second radiating section, wherein a length of the first radiating section is greater than a length of the second radiating section, the first radiating element is used to excite a first resonant frequency, and the second radiating element is used to excite a second resonant frequency, wherein the first radiating section comprises a first section, a second section, and a third section, the second section extends along a first direction, the first section and the third section extend along a second direction perpendicular to the first direction, the first section, the second section, and the third section form a plurality of bends to jointly form a first loop structure with the excited section, and a portion of an orthographic projection of the first loop structure to the metal cover overlaps with the slot, wherein the second radiating section comprises a fourth section, a fifth section, and a sixth section, the fifth section extends along the first direction, the fourth section and the sixth section extend along the second direction, the fourth section, the fifth section, and the sixth section form a plurality of bends to jointly form a second loop structure with the excited section, and a portion of an orthographic projection of the second loop structure to the metal cover overlaps with the slot.

2. The antenna module according to claim 1, wherein a first length of the slot along the first direction is greater than or equal to 2 mm, and a second length of the slot along the second direction is between 40 mm and 70 mm.

3. The antenna module according to claim 2, wherein a third length of the first radiating element along the second direction is between ½ wavelength and ¼ wavelength of the first resonant frequency.

4. The antenna module according to claim 2, wherein a fourth length of the second radiating element along the second direction is between ½ wavelength and ¼ wavelength of the second resonant frequency.

5. The antenna module according to claim 1, wherein the slot has a first side and a second side opposite to each other, the excited section is lapped between the first side and the second side, the first side is farther away from the feeding point than the second side, the first section and the fourth section correspond to the first side, and the third section and the sixth section correspond to the second side.

6. The antenna module according to claim 5, wherein a distance from the first section and the fourth section to the first side is between 1 mm and 3 mm.

7. The antenna module according to claim 1, wherein the substrate has a first region surrounded by the first loop structure, the antenna module further comprises a first matching section connected to the first section, and the first matching section protrudes from the first section toward the first region and overlaps the slot.

8. The antenna module according to claim 7, wherein in the second direction, a distance from the first matching section to the feeding point is between ⅛ wavelength and ⅜ wavelength of the first resonant frequency.

9. The antenna module according to claim 7, wherein the substrate has a second region surrounded by the second loop structure, the antenna module further comprises a second matching section connected to the fourth section, and the second matching section protrudes from the fourth section toward the second region and overlaps the slot.

10. The antenna module according to claim 9, wherein in the second direction, a distance from the second matching section to the feeding point is between ⅛ wavelength and ⅜ wavelength of the second resonant frequency.

11. The antenna module according to claim 1, wherein the antenna module further comprises a metal sheet, and the metal sheet is connected to the substrate and the metal cover.

12. The antenna module according to claim 1, wherein an end of the excited section away from the feeding point has a via hole, the via hole penetrates the substrate, and the antenna module further comprises a metal layer located on an inner side of the via hole and extending from the excited section to adjoin the slot.

13. The antenna module according to claim 12, wherein at least a portion of a current of the first radiating section flows through the metal cover.

14. The antenna module according to claim 1, wherein at least a portion of a current of the second radiating section flows through the metal cover.

15. An electronic device, comprising:

a first body, comprising a metal cover, and the metal cover having a slot; and an antenna module, disposed in the metal cover, and the antenna module comprising:

a substrate, disposed corresponding to the slot;

a first radiating element, disposed on the substrate, comprising an excited section and a first radiating section connected in sequence, and the excited section having a feeding point; and a second radiating element, disposed on the substrate, comprising the excited section and a second radiating section connected in sequence, wherein the excited section is located between the first radiating section and the second radiating section, wherein a length of the first radiating section is greater than a length of the second radiating section, the first radiating element is used to excite a first resonant frequency, and the second radiating element is used to excite a second resonant frequency, wherein the first radiating section comprises a first section, a second section, and a third section, the second section extends along a first direction, the first section and the third section extend along a second direction perpendicular to the first direction, the first section, the second section, and the third section form a plurality of bends to jointly form a first loop structure with the excited section, the metal cover has a first surface facing away from the substrate, the slot is located on the first surface, and a portion of an orthographic projection of the first loop structure to the metal cover overlaps with the slot, wherein the second radiating section comprises a fourth section, a fifth section, and a sixth section, the fifth section extends along the first direction, the fourth section and the sixth section extend along the second direction, the fourth section, the fifth section, and the sixth section form a plurality of bends to jointly form a second loop structure with the excited section, and a portion of an orthographic projection of the second loop structure to the metal cover overlaps with the slot.

16. The electronic device according to claim 15, wherein a first length of the slot along the first direction is greater than or equal to 2 mm, and a second length of the slot along the second direction is between 40 mm and 70 mm.

17. The electronic device according to claim 16, wherein a third length of the first radiating element along the second direction is between ½ wavelength and ¼ wavelength of the first resonant frequency.

18. The electronic device according to claim 16, wherein a fourth length of the second radiating element along the second direction is between ½ wavelength and ¼ wavelength of the second resonant frequency.

19. The electronic device according to claim 15, wherein the slot has a first side and a second side opposite to each other, the excited section is lapped between the first side and the second side, the first side is farther away from the feeding point than the second side, the first section and the fourth section correspond to the first side, and the third section and the sixth section correspond to the second side.

20. The electronic device according to claim 19, wherein a distance from the first section and the fourth section to the first side is between 1 mm and 3 mm.

21. The electronic device according to claim 15, wherein the substrate has a first region surrounded by the first loop structure, the electronic device further comprises a first matching section connected to the first section, and the first matching section protrudes from the first section toward the first region and overlaps the slot.

22. The electronic device according to claim 21, wherein in the second direction, a distance from the first matching section to the feeding point is between ⅛ wavelength and ⅜ wavelength of the first resonant frequency.

23. The electronic device according to claim 21, wherein the substrate has a second region surrounded by the second loop structure, the antenna module further comprises a second matching section connected to the fourth section, and the second matching section protrudes from the fourth section toward the second region and overlaps the slot.

24. The electronic device according to claim 23, wherein in the second direction, a distance from the second matching section to the feeding point is between ⅛ wavelength and ⅜ wavelength of the second resonant frequency.

25. The electronic device according to claim 15, wherein the antenna module further comprises a metal sheet, and the metal sheet is connected to the substrate and the metal cover.

26. The electronic device according to claim 15, wherein an end of the excited section away from the feeding point has a via hole, the via hole penetrates the substrate, and the antenna module further comprises a metal layer located on an inner side of the via hole and extending from the excited section to adjoin the slot.

27. The electronic device according to claim 26, wherein at least a portion of a current of the first radiating section flows through the metal cover.

28. The electronic device according to claim 26, wherein at least a portion of a current of the second radiating section flows through the metal cover.

29. The electronic device according to claim 15, further comprising a second body, pivotally connected to the first body, wherein the first body is a display body, and the second body is a logic body.

* * * * *